United States Patent [19]

Wu

[11] Patent Number: 4,821,318

[45] Date of Patent: Apr. 11, 1989

[54] CONVERTIBLE HANDSET DEVICE FOR TELEPHONE SETS

[76] Inventor: Chuan-Chi Wu, 4th Fl., No. 279, An-Ching St., Sanchung City, Taiwan

[21] Appl. No.: 63,489

[22] Filed: Jun. 18, 1987

[30] Foreign Application Priority Data

Apr. 17, 1987 [TW] Taiwan .............................. 76203385

[51] Int. Cl.⁴ ............................................ H04M 1/05
[52] U.S. Cl. .................................... 379/430; 379/433; 381/183
[58] Field of Search ............... 379/368, 430, 431, 433, 379/434; 381/183, 188, 25, 187; D14/53, 52, 60, 61, 62, 63, 64, 65, 66, 67, 36

[56] References Cited

U.S. PATENT DOCUMENTS

| 2,503,846 | 4/1950 | Shonn | 379/430 |
|---|---|---|---|
| 2,508,642 | 5/1950 | Herrick | 379/433 |
| 2,508,654 | 5/1950 | Sears | 379/433 |
| 2,538,458 | 1/1951 | Hutchinson | 379/430 |
| 3,072,755 | 1/1963 | Kuhberg | 379/430 |
| 3,356,797 | 12/1967 | Konzelmann et al. | 379/430 |
| 3,682,268 | 8/1972 | Gorike | 381/187 X |
| 3,971,900 | 7/1976 | Foley | 379/430 |
| 4,039,765 | 8/1977 | Tichy et al. | 379/430 |
| 4,056,696 | 11/1977 | Meyerle et al. | 379/419 |
| 4,121,061 | 10/1978 | Donaldson | 379/430 |
| 4,179,590 | 12/1979 | Snow | 379/388 |
| 4,634,816 | 1/1987 | O'Malley et al. | 379/430 |

FOREIGN PATENT DOCUMENTS

| 2060888 | 6/1972 | Fed. Rep. of Germany | 379/433 |
|---|---|---|---|
| 1541794 | 10/1968 | France | 379/433 |
| 2533783 | 3/1984 | France | 379/433 |
| 0071544 | 1/1953 | Netherlands | 379/430 |
| 0008262 | of 1904 | United Kingdom | 379/433 |
| 1185777 | 3/1970 | United Kingdom | 379/433 |

Primary Examiner—Jin F. Ng
Assistant Examiner—Randall S. Vaas
Attorney, Agent, or Firm—Ladas & Parry

[57] ABSTRACT

A convertible handset device for telephone sets includes: a handset body with a handle portion in the middle having a cord groove formed therein, a first internal trough with a trough mouth at one end and a second internal trough with an end opening at the other end; a conductive cord electrically installed in said cord groove in connection with a telephone set; a receiving unit with a receiver portion at one end and a flexible link at the other movably disposed in said first internal trough and electrically coupled to the conductive cord in the cord groove, and a transmitting unit with a transmitter portion at one end and an adjustable link at the other movably arranged in the second internal trough and electrically connected to the conductive cord in the cord groove. Thereby, the handset device can be either held in one hand or worn over the head.

8 Claims, 2 Drawing Sheets

CONVERTIBLE HANDSET DEVICE FOR TELEPHONE SETS

BACKGROUND OF THE INVENTION

This invention relates to a handset device for telephone sets, and more particularly to a convertible handset device designed to be either held in hand or worn over the head.

The conventional handset for telephone sets is usually formed in an arcuate shape having a receiver installed at one end and a transmitter at the other end with the center portion adapted to be held in one hand. Since a telephone set is an indispensable instrument in our daily life, the increasing need for convenience requires that a greater number of telephone sets be installed throughout areas such as offices, shops, homes, etc. However, because the conventional handset provided on the telephone sets must be held in one hand when making or answering a telephone call, it often presents a great inconvenience when the user is kept busy working with his hands. In this situation, the user usually tilts his head and holds the handset between the shoulder and the head in order to free his hands continue working while listening and talking through the handset. Alternatively, the user must simply stop working in order to hold the handset in hand and exclusively engage himself in telephone conversation because the structure of the conventional handset provides no other option.

SUMMARY OF THE INVENTION

It is accordingly a primary object of this invention to provide a convertible handset device for telephone sets which handset device can be either held in one hand or worn over the head so as to overcome the foregoing problems associated with the prior art.

With the above and other objects in mind, this invention provides a convertible handset device for telephone sets, which handset device comprises: a handset body with a handle portion in the middle having a cord groove formed therein, a first internal trough with a trough mouth in one end and an external passage with an end opening in the other end; conductive means electrically installed in said cord groove; a receiving means with a flexible link and a first contact engaging member movably disposed in said first internal trough through the trough mouth thereof and electrically connected to said conductive means at one end thereof; and a transmitting means with an adjustable link and a second contact engaging member movably arranged along said external passage through the end opening thereof and electrically connected to said conductive means at the other end. Thereby, the handset device can be either held in one hand or worn over the head.

Other advantages and characteristics of the invention will become clear in the following detailed description of a preferred embodiment when read with reference to the accompanying drawings.

BRIEF DESCRIPTION OF THE DRAWINGS

FIG. 3 (B) is an illustrative view indicating a general structure of a receiving and/or a transmitting means of the preferred embodiment shown in FIG. 3 (A).

DETAILED DESCRIPTION OF THE PREFERRED EMBODIMENT

Figure 1:
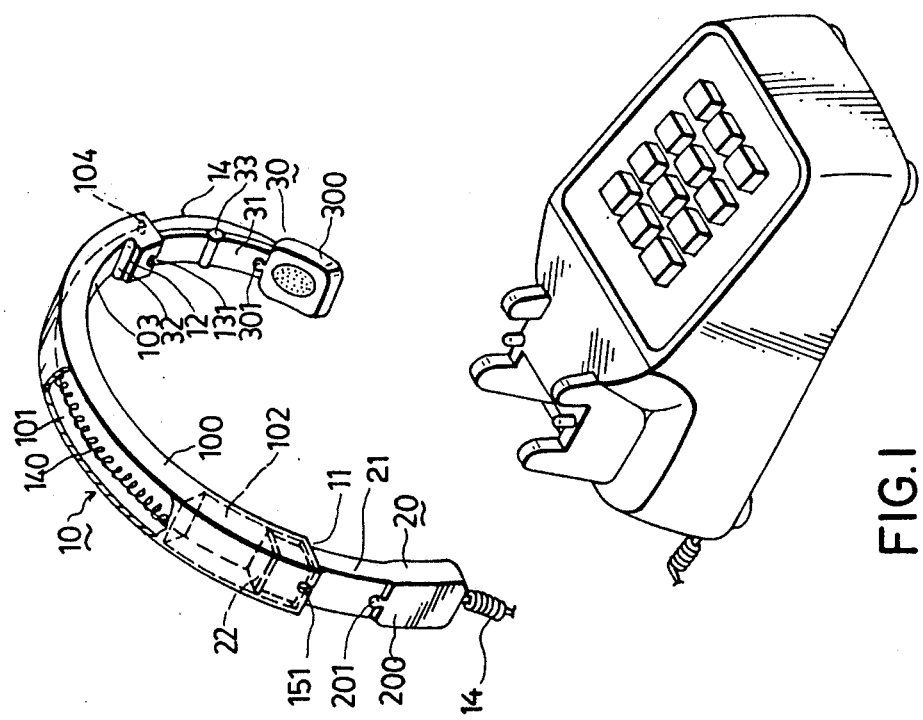
FIG. 1 is a perspective and partial cut-away view of a preferred embodiment of a convertible handset for telephone sets according to this invention.

Referring to FIG. 1, the preferred embodiment of a convertible handset device for telephone sets according to this invention comprises in combination a handset body 10, a receiving unit 20 and a transmitting unit 30. The handset body 10 integrally formed in an arch shape including a handle portion 100 with a cord groove 101 in the middle, a first internal trough 102 with a trough mouth 11 at one end. An external passage 103 with a cord channel 104 leading to the cord groove 101 in the other end, is adapted to be placed over the switchhook of a telephone set in a way similar to the conventional handset. A conductive cord 14 with an elastic portion 140 in the middle is disposed in the cord groove 101 and electrically connected to the telephone circuit of the telephone sets. The receiving unit 20, including a receiver portion 200 at one end with a receiver installed therein and electrically connected to the conductive cord 14, and a flexible link 21 at the other end with a stop edge 22 around the end, is movably installed in the first internal trough 102. The receiver portion 200 further includes a first contact engaging member 201 integrally formed at a back side thereof for being detachably engaged with a first engaging recess 151 provided at an outer side of the trough mouth 11 when the receiving unit 20 is pushed into the first internal trough 102 of the handset body 10. The transmitting unit 30, including a transmitter portion 300 at one end having a transmitter installed therein and electrically connected to the conductive cord 14 through cord channel 104, and an adjustable link 31 at the other end with a flange 32 around the end and an elbow joint 33 in the middle, is movably disposed in an end opening 12 of the handset 10 for being moved to and fro along the external passage 103. The transmitter portion 300 also includes a second contact engaging member 301 integrally provided at a front side thereof for being detachably engaged with a second engaging recess 131 integrally formed at an inside edge of the end opening 12 when the transmitter unit 30 is pushed backward along the external passage of the handset body 10.

It shall be appreciated that, when the receiver unit 20 and the transmitter unit 30 are kept in retraction within the handset body 10 and secured in position through both contact engaging members 201 and 301, the handset body 10 is used as an ordinary handset for being held in one hand during telephone conversation. Meanhile, if the user's hands have to be occupied, the handset body 10 can be worn over the user's head simply by pulling out the receiver unit 20 and the transmitter unit 30 as a headset. It shall be further appreciated that the elbow joint 33 of the adjustable when the handset body 10 is worn over the head with the transmitter unit 30 being pulled out, the adjustable link 31 can be optionally adjusted for keeping the transmitter portion 300 close to the user's mouth.

Figure 2:
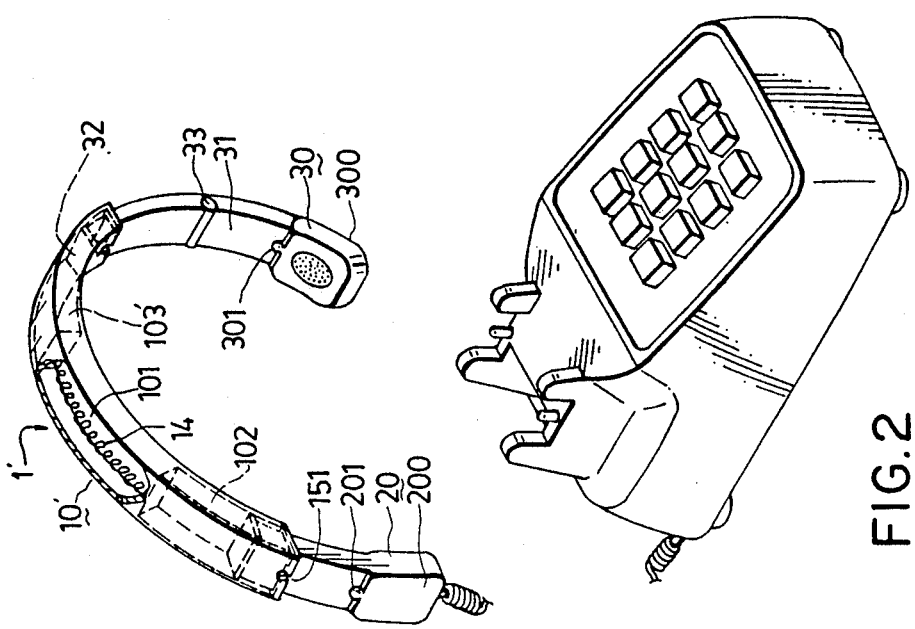
FIG. 2 is a perspective and partial cut-away view of an alternative example of the handset body of the preferred embodiment shown in FIG. 1.

Referring to FIG. 2, there is shown an alternative embodiment of the handset body 10' wherein all members or elements identical with or corresponding to those illustrated in FIG. 1 are indicated by the same reference numerals, and, therefore, explanation of those members or elements is omitted. As can be clearly seen in FIG. 2, the handset body 10' includes a second internal trough 103' with the transmitter unit 30 movably disposed therein. It shall be appreciated that with the formation of the second internal trough 103', the thickness of the end portion of the handset body 10' for accommodating the transmitter unit 30 is thicker than that of the handset body 10 shown in FIG. 1, but the function remains unchanged.

Figure 3A:
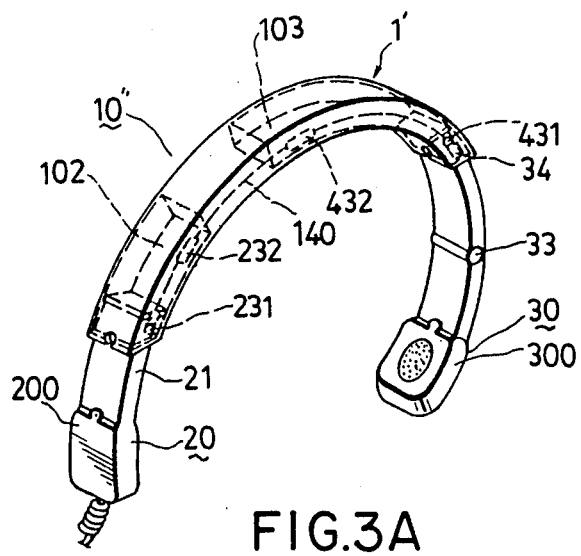
FIG. 3 (A) is a perspective view of another alternative example of the preferred embodiment shown in FIG. 1.
Figure 3B:
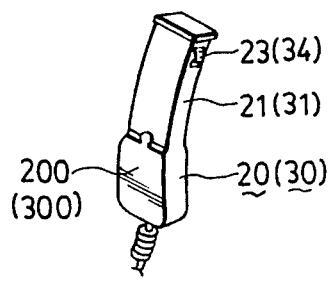

Referring to FIGS. 3 (A, B), there is shown a further alternative embodiment of the convertible handset device 1' for telephone sets according to this invention. In this alternative embodiment, elements identical or corresponding to those illustrated in FIGS. 1 and 2 are also indicated by the same reference numerals and explanation is omitted. The handset body 10" of the embodiment includes two sets of conductive contactors 231, 232 and 431, 432 respectively provided in the opposite ends of the first and second troughs 102 and 103' and separately connected to the electrical cord 14, of which the elastic portion 140 (as shown in FIG. 1) is not required. As shown in FIG. 3 (A, B), the receiver unit 20 and the transmitter unit 30 are respectively provided with a conductive contact point 23, 34 on each side thereof and electrically connected to the respective receiver and transmitter installed in the receiver and transmitter portions 200 and 300. When the receiver and transmitter units 20 and 30 are in retracted position within the handset body 10" for hand holding, the conductive contact points 23 and 34 of the receiver and transmitter units 20 and 30 will be respectively kept in electrical contact with the conductive contactors 232 and 432 of the handset body 10" while when the receiver and transmitter units 20 and 30 are pulled out from the handset body 10" for overhead wearing, the conductive contact point 23 and 34 of the receiver and transmitter units 20 and 30 will be separately kept in contact with the conductive contactors 231 and 431 of the handset body 10".

Having thus described the invention, it is to be understood that many embodiments thereof will suggest themselves without departing from the spirit and scope of the invention. Therefore, it is intended that the specification and drawings be interpreted as illustrative rather than in a limiting sense except as defined in the appended claims.

What is claimed is:

1. A convertible handset device for telephone sets comprising:
   a handset body integrally formed in an arch shape and adapted to be placed over a switchhook of a telephone set, including a central handle portion having a cord groove located therein, a first internal trough with a trough mouth at one end, and a second internal trough with an end opening at another end, and an engaging recess formed at each side edge of said first and second internal troughs for making a detachable engagement therewith;
   conductive means respectively installed in said cord groove and said first and second internal passages for being electrically connected to a telephone line of a telephone set; a receiving means having a receiver portion at one end with a receiver installed therein and electrically connected to said conductive means, and a flexible link at the other end being movably disposed in said first internal trough through said trough mouth for being movably operated in receiving telephone calls therewith; and a transmitting means having a transmitter portion at one end and a transmitter installed therein and an adjustable link at the other end being movably disposed in said second internal trough through said end opening for being movably operated in answering telephone calls, whereby, said handset device can be either held in one hand or worn over the head with said receiver portion and transmitter portion being pulled out when making and answering telephone calls.

2. A convertible handset device according to claim 1 wherein said conductive means comprises a pair of conductive contactors separately disposed at each end of said first internal trough in said handset body and electrically connected to an electrical cord for said receiving means through said cord groove, and another pair of conductive contacts separately disposed at each end of said second internal trough and electrically connected to an electrical cord for said transmitting means through said cord groove, so that a separate receiving/transmitting circuit is formed for being electrically engaged by said receiving means and said transmitting means at either a retracted position or an extended position.

3. A convertible handset device according to claim 1 wherein said receiving means comprises:
   a receiving unit with a receiver portion at one end and a flexible link at the other;
   said receiver portion including a receiver installed therein and electrically connected to an electrical cord of a telephone set, and a first contact engaging member provided at one side thereof for being detachably engaged with a first engaging recess at the side edge of said trough mouth; said flexible link including a stop edge provided around an end thereof for being abutted against said trough mouth, and a first conductive contact point provided at one side thereof and electrically connected to said receiver for being kept in electrical contact with each one of said conductive contacts separately located in said first internal trough.

4. A convertible handset device according to claim 1 wherein said transmitting means comprises:
   a transmitting unit with a transmitter portion at one end and an adjustable link at the other;
   said transmitter portion including a transmitter installed therein and a second contact engaging member provided at one side thereof for being detachably engaged with a second engaging recess of said opening, and said adjustable link including a flange formed around an end thereof, a friction-type elbow joint provided in a middle area, and a conductive contact point disposed at one side and electrically connected to said transmitter for being kept in electrical contact with either one of said conductive contactors in said second internal trough.

5. A convertible handset device for telephone sets comprising: a handset body integrally formed in an arch shape and adapted to be placed over a switchhook of a telephone set and including a central handle portion having a cord groove located therein, a first internal trough with a trough mouth at one end, and an external passage with an end opening at the other end; conductive means installed in said cord groove for being electrically connected to a telephone set; a receiving means having a receiver electrically installed therein, and a flexible link formed at one end movably disposed in said first internal trough through said trough mouth and electrically connected to said conductive means at one end for being movably operated in receiving telephone calls; a transmitting means having a transmitter installed therein and an adjustable link provided at one end movably disposed in said end opening and electrically connected to said conductive means for being movably operated along said external passage when answering telephone calls; and a pair of engaging recesses respectively provided at a side edge of said trough mouth and said end opening for detachably securing said receiving means and said transmitting means therewith; whereby said handset device can be used either being held in one hand or worn over the head in making and answering telephone calls.

6. A convertible handset device according to claim 5, wherein said conductive means includes a conductive cord having an elastic portion arranged in said cord groove so as to be extended and retracted in conjunction with the movement of said receiving and transmitting means.

7. A convertible handset device according to claim 5, wherein said receiving means comprises: a receiving unit having a receiver portion at one end with a receiver installed therein and electrically connected to said conductive means, and a flexible link at the other end with a stop edge formed around an end thereof, being movably disposed in said first internal trough for being movably operated within said first trough, and a first contact engaging member provided at a back side of said receiver portion for being detachably engaged with the engaging recess at the side edge of said trough mouth so as to detachably secure said receiving unit in said first trough.

8. A convertible handset device according to claim 5, wherein said transmitting means comprises: a transmitting unit, having a transmitter portion at one end with a transmitter installed therein and electrically connected to said conductive means, and an adjustable extension link at the other end with a flange formed at an end thereof being moveably disposed in said opening for being moved along said external passage of said handset body, said adjustable link including a friction-type elbow joint provided in a middle area thereof for adjusting said transmitter portion to a position which is close to a user's mouth on being extended from said external passage; and a second contact engaging member provided at one side of said transmitter portion for being detachably engaged with the engaging recess at the side edge of said end opening so as to detachably secure said receiving unit in position in said external passage.

* * * * *